US007813724B2

(12) United States Patent
Gronner et al.

(10) Patent No.: US 7,813,724 B2
(45) Date of Patent: Oct. 12, 2010

(54) SYSTEM AND METHOD FOR MULTIMEDIA-TO-VIDEO CONVERSION TO ENHANCE REAL-TIME MOBILE VIDEO SERVICES

(75) Inventors: Mosh Gronner, Petach Tikva (IL); Ronen Halsadi, Yahud (IL); Amir Kirsh, Ramat Gan (IL)

(73) Assignee: Comverse Ltd., Tel Aviv (IL)

( * ) Notice: Subject to any disclaimer, the term of this patent is extended or adjusted under 35 U.S.C. 154(b) by 788 days.

(21) Appl. No.: 11/486,044

(22) Filed: Jul. 14, 2006

(65) Prior Publication Data

US 2007/0216761 A1 Sep. 20, 2007

Related U.S. Application Data

(60) Provisional application No. 60/783,047, filed on Mar. 17, 2006.

(51) Int. Cl.
*H04L 29/08* (2006.01)
(52) U.S. Cl. .................................................. 455/414.4
(58) Field of Classification Search .............. 455/14.02, 455/414.1, 556.1, 574, 552.1, 560, 566, 550.1, 455/417, 500, 90.3, 466, 557, 90.1, 414.4; 370/350, 328
See application file for complete search history.

(56) References Cited

U.S. PATENT DOCUMENTS

| 6,118,498 A * | 9/2000 | Reitmeier .................. 348/725 |
| 2007/0281743 A1* | 12/2007 | Palin et al. .................. 455/557 |
| 2008/0125107 A1* | 5/2008 | Zechlin et al. ........... 455/422.1 |
| 2009/0017795 A1* | 1/2009 | Guichard et al. ......... 455/414.1 |

* cited by examiner

*Primary Examiner*—Melody Mehrpour
(74) *Attorney, Agent, or Firm*—Ohlandt, Greeley, Ruggiero & Perle, L.L.P.

(57) ABSTRACT

A communication system converting multimedia data of enhanced services into video stream for transmission to a user's handset communication device. The system includes a database storing therein users profile data; a mailbox system storing therein users mailboxes and capable of storing messages in audio and video formats; an application server managing data storage and retrieval from the database and storage; a multimedia to video converter, receiving multimedia data and converting it into a video streams corresponding to a pre-selected template; an access server providing the multimedia data to the multimedia to video converter and receiving therefrom the video stream, and transmitting the video stream onto a telecommunication network.

38 Claims, 5 Drawing Sheets

SYSTEM AND METHOD FOR MULTIMEDIA-TO-VIDEO CONVERSION TO ENHANCE REAL-TIME MOBILE VIDEO SERVICES

RELATED APPLICATIONS

This application claims priority from U.S. Provisional application Ser. No. 60/783,047, filed Mar. 17, 2006, the entire disclosure of which is incorporated herein by reference.

BACKGROUND

1. Field of the Invention

The subject invention relates to wireless telephony and, more specifically, to usage of infrastructure for multimedia-to-video conversion to enhance real-time mobile video service.

2. Related Art

Video transmission in telephony system is well known, especially on landline phone systems. Recently, various standards have been established for video transmission over mobile phone systems. However, video screens that are used in today's mobile video services are mostly based on professional work from video editing studios that use sophisticated equipment, such as exists in TV or art studios, to edit and generate video screens. In this working mode, the person designing the video screen uses dedicated equipment to edit the design of video screens, its graphical elements, displayed text, its location and possibly its dynamics (appearance, movement), and so on. At the end of this process, a set of fixed video files is created. These files are uploaded to the operational system to be used in the real-time service.

As an alternative to studio work, commercial tools are available which usually handle specific aspects that are required for the process of creating video, including: video editing, conversion of pictures to video, conversion of text to video, creation of animated graphics (e.g. Flash), combining audio with video (audio dubbing) and more. Virtually all commercially available tools are standalone software packages (or systems) that are operated manually by users in different levels of expertise, and serve a specific purpose or a restricted set of functions for preparation and editing of video content. Examples of such tools are:

Ulead VideoStudio by Ulead
Pinnacle Studio by Pinnacle
DVD-lab Pro by Media Chance
Real Producer by RealNetworks
VirtualDub (GNU open source)
FFMPEG (GNU open source), and more.

Additionally, some applications rely on a client software to run. Using such a system requires that the client software be installed on a compatible handheld device, and that the client software be compatible with the application. This presents the possibility that a person using one service provider may not be able to receive a video transmission from a subscriber using a different service provider if the application is not compatible. Additionally, this limits the number of customers who use the video service only to those who upgraded their handheld device to a compatible device having the proper client software.

The various standards for implementation of current state of the art mobile telephony, generally referred to herein as 3G, incorporate protocols for video calls, which is an advancement over prior art audio or voice calls. Accordingly, the current assignee, Comverse, has recently developed a state of the art mailbox that is operable as a video mailbox in addition to voice and/or text mailbox. Using this mailbox, a subscriber can, for example, leave a greeting in the form of a video clip. Similarly, callers to the subscriber can leave messages in the form of video clips. When the video clips are transmitted to the subscriber, they are formatted, coded and transmitted using the various 3G standards. As can be appreciated, the mailbox provides improved multi-media communications services to the users, which increase usage of 3G enhanced features and, thereby increase revenue of service providers.

While the various 3G standards provide the protocols for video and voice transmission, they speak only in terms of how to transmit such data, but do not provide information as to what can be transmitted using this infrastructure. That is, the 3G standards do not define the content of the video and/or voice transmission.

SUMMARY

The subject invention provides various apparatus and methods for utilizing the predefined video enabled networks, e.g., 3G, to provide further enhanced services to subscribers. In this context, "enhanced service" means service that is offered over commercial carrier transmission facilities used in telephony, that employs computer processing applications acting on the format, content, code, protocol, or similar aspects of the subscriber's transmitted information; provides the subscriber with additional, different, or restructured information; or involves subscriber interaction with stored information. According to various aspects of the invention, the mobile network infrastructure is utilized to deliver features that enrich the user's experience and simplify various activities, such as mailbox management, etc.

According to one aspect of the invention, the mobile network infrastructure is utilized to dynamically create and transmit video and graphic information to construct various dynamic graphical screens. That is, in addition to transmission of pre-recorded video clips, such as video greeting or video messages, using aspects of the invention the video transmission infrastructure can also be used for enabling other features in the mobile telephony system. For example, video transmission can be used to provide dynamic graphical display on the mobile handset, akin to a graphical user interface. According to embodiments of the invention, various informational data can be assembled and converted into a video stream to be transmitted to the handheld device and be displayed in a graphical format on the screen. Since the transmission is in video format, the display can be dynamic, i.e., include fixed graphical elements and dynamic elements, such as animation or video clips. Additionally, the system can receive input from the user, e.g., DTMF keyed input, and react to the input dynamically by generating and transmitting a response in the form of video transmission.

According to another aspect of the invention, an infrastructure for real-time conversion of different types of multimedia to video media allows the creation of dynamic video streams that incorporate animated text, graphics and/or other information. These video streams are conveyed to users of different mobile video applications in the areas of video communications and video infotainment—such as video mailbox, video portal, video games, and more.

According to yet other aspects of the invention, systems and methods are disclosed which allow using frequently changing data, and different kinds of media, as input for the process of generating video streams for feature-reach mobile service. These streams are eventually transmitted over mobile networks and displayed on the screens of video-capable handsets, in circuit switched or IP-based video telephony networks. The systems and method disclosed can convert raw system information such as system data, text or images into video streams, on the fly (i.e., in real-time), to enhance the user experience in widely deployed mobile video services, such as video mailbox, video portal or video IVR. The transmission of these video streams enables presenting dynamic and relevant information in a much more appealing way than possible in conventional solutions. These capabilities also allow to enrich the service experience by presenting information, which was previously inaccessible through a video interface—such as e-mail headers and contents, business and infotainment content, and more. When receiving this rich information, that in an interactive service may include a set of options to select from to continue the service, the user can interact with the system by pressing DTMF keys corresponding to the option that are presented by the service, pressing the appropriate keys in the mobile device's touch screen (if exists), or any other interaction method that will cause the mobile device to send a signal to the remote system, which corresponds to the user's selection.

According to an aspect of the invention, a communication system converting multimedia data into video stream for transmission to a user's handset communication device is provided. The system includes a database storing therein users profile data; an optional mailbox system storing therein users mailboxes and capable of storing messages in audio and video formats; an application server managing data storage and retrieval from the database and mailbox system; a multimedia to video converter, receiving multimedia data and converting it into a video streams corresponding to a pre-selected template; an access server providing the multimedia data to the multimedia to video converter and receiving therefrom the video stream, and transmitting the video stream onto a telecommunication network.

According to various features of the invention, the multimedia data is the system data or user data, and the system data or user data may be in the format of textual data, images, audio clips, and/or video clips; while the images may be graphics and/or photography images. The video clips may be animation clips and/or cinematic clips. The multimedia to video converter may be implemented in the form of a plurality of media processing modules, each one converting one of textual data, images, and audio clips into a video-transmission format files. Additionally, an editor may be provided for concatenating the video-transmission format files into a single video stream. The video stream forms a dynamic graphical display or a visual interface on a handset of a user. The layout of the visual interface is dictated by the template. The visual interface may include graphical items, graphic animation, text and/or video. The graphical items may be active icons, such as function, program or document icons.

According to yet other aspects of the invention, the storage system includes a template storage location for storing a plurality of templates, each of the templates including instructions regarding the looks and dynamics of a video screen to be displayed on a user device. The storage system may further include a background storage location storing a plurality of graphic backgrounds. The storage system may further include an icon storage location storing a plurality of icons, such as function, program or document icons, etc. Each of the stored templates may include selection pointers to at least one of the graphic backgrounds and graphical icons, and the multimedia to video converter fetches graphic backgrounds and graphical icons according to the pointers, and incorporates the fetched graphic background or fetched graphical icon into the video stream.

According to further aspects of the invention, the multimedia to video converter includes an image to video converter for converting pictorial and graphical images into video streams. The multimedia to video converter may further include a text to video converter. Additionally, the multimedia to video converter further includes a video editor for editing the video stream by resizing, cropping or applying filters to the video stream.

The system may further include a database storing therein a user profile data and mailbox for storing messages. The system data may include status data of the messages, and the multimedia to video converter converts the status data into a video stream for transmission to the mobile device of the user. Alternatively, or in addition, a library database storing a video clips and video data providing information relating to each of the video clips may be provided. The multimedia to video converter converts the video data into a video stream for transmission to the mobile device of the user.

According to another aspect of the invention, a method is provided for operating a communication server connected to communication network that communicates with handsets. The method includes the steps: assigning a plurality of user accounts, each of the user accounts corresponding to one of the handsets to thereby create corresponding accounts to at least a subset of the handsets; storing data corresponding to each of the user accounts in a database; upon receiving a call initiation from a caller handset, determining whether one of the user accounts correspond to the caller handset and, if so, performing the steps: fetching said data corresponding to the user account of the caller handset; converting the data into a video stream; transmitting the video stream to the caller handset.

BRIEF DESCRIPTION OF THE DRAWINGS

Other aspects and features of the invention would be apparent from the detailed description, which is made with reference to the following drawings. It should be appreciated that the detailed description and the drawings provide various non-limiting examples of various embodiments of the invention, which is defined by the appended claims.

DETAILED DESCRIPTION

Figure 1:
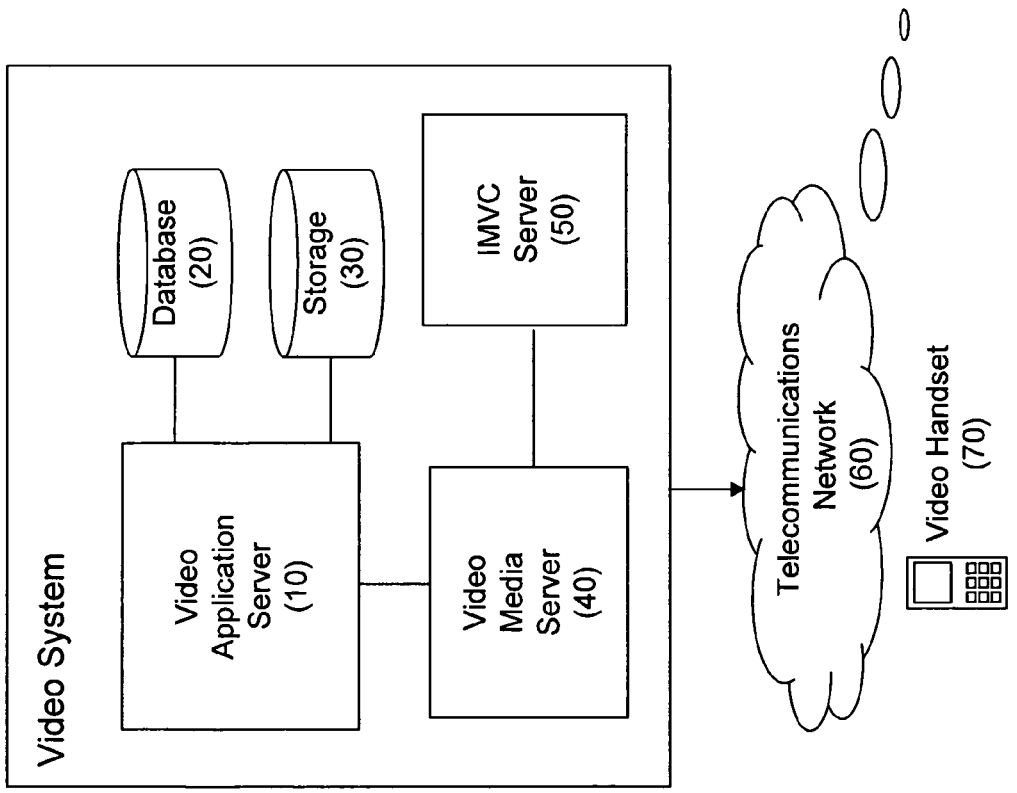
FIG. 1 is a block diagram of a first embodiment of the invention.

FIG. 1 is a block diagram of a first embodiment of the invention. As shown, a mobile video application server 10, is a conventional application server, such as those conventionally used for telecommunication services, that is used to manage subscriber accounts and control different flows of mobile services. The server 10 is linked to database 20, where users' profiles are stored and managed and where fixed system files, such as system greetings, are stored. Server 10 is also linked to storage, 30, where subscriber-related data, such as video messages, or system changeable data such as video content, are stored. As can be understood, database 20 and storage 30 are implemented using conventional storage systems and may implemented as an integrated system or two separate systems. The objective is to provide the server 10 a place to store and manage accounts data.

The Server 10 is also linked to the video media server, 40, which is the element that provides the access layer towards the telecommunications network 60. Telecommunications network, 60, is the conventional operator's mobile or wireline network, through which actual media flows when a user interacts with the system via the video handset 70. Video handset, 70, is a conventional mobile or wireline video-capable endpoint, which the user utilizes to interact with the system. As is further shown in FIG. 1, the video media server 40 is linked to an Infrastructure for Multimedia-to-Video Conversion server (IMVC) 50. The IMVC Server 50 is the element that incorporates the infrastructure for multimedia-to-video conversion, and provides the capabilities to convert multimedia to dynamic video streams, in a manner illustrated below.

Figure 2:
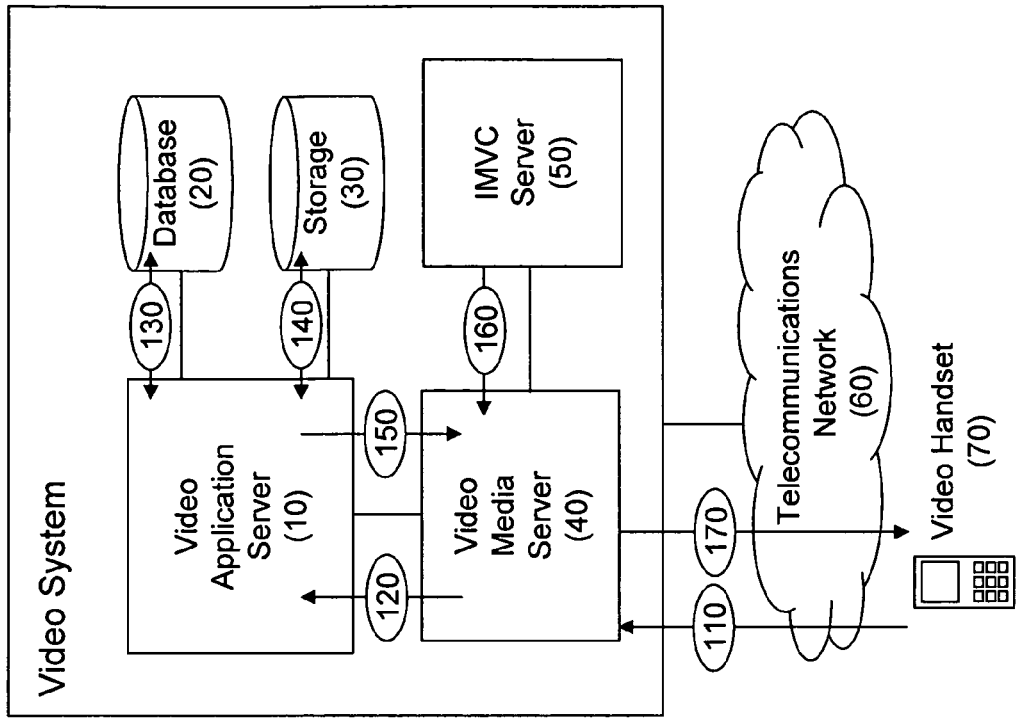
FIG. 2 depicts the process flow according to an embodiment of the invention with respect to the embodiment illustrated in FIG. 1.

FIG. 2 depicts the process flow according to an embodiment of the invention with respect to the embodiment illustrated in FIG. 1. When a user initiates a video call, video handset 70 establishes a video call 110 with the video media server 40 through the telecommunications network 60. In response, video media server 40 initiates a session 120 with the video application server 10, whereupon the video application server 10 loads the user profile 130 from the database 20. The video application server 10 also loads the subscriber quota and/or subscriber stored information and/or system variable video content 140 from the storage 30. Video application server 10 then sends text/graphics or other data 150, accompanied with a "Template ID," to the video media server 40, requesting it to relay that information to the user as part of the video call, according to the specific appearance scheme ("Template") as pointed to in the "Template ID".

The video application server 10, selects the Template ID to be used according to the state of the system. For example, upon initiation of the call, the Template ID would correspond to a Template relating to a greeting screen or to a screen showing the status of the mailbox, etc. That is, by sending the Template ID, the video application server 10 requests the generation of a video stream that would generate a dynamic graphical display according to a template corresponding to the sent Template ID.

In order to convert the relevant data 150 to a video stream, video media server 40 accesses the IMVC server 50, and conveys to it the relevant data and the Template ID. The IMVC server 50 then converts all of the received data into a video stream based upon the template corresponding to the Template ID, and outputs the video stream 160 to the video media server 40. Video media server 40 then transmits the resulting video stream 170 to the video handset 70 via the telecommunications network 60.

The templates may be SMIL/XSL files (SMIL=Synchronized Multimedia Integration Language, a sort of syntax to describe a "presentation" or screen contents that change with time; XSL=Extensible Stylesheet Language, a syntax used to describe style attributes for content through logical operations) that can be generated either manually using a text editor or through a dedicated editor (desktop user application) that produces corresponding output.

It should be appreciated that the embodiment illustrated in FIGS. 1 and 2 gives providers of video services a significantly better means for establishing dynamic video services over telecommunications networks. Additionally, using these embodiments a much more flexible service can be provided, compared to usage of currently available commercial utilities and tools for to content preparation. The resulting benefits are at least in the following aspects:

- A generic client-server concept that allows adding the capabilities of the infrastructure for multimedia-to-video conversion to virtually any video-capable system targeted at the video communications domain.
- Suitability for real-time services, for multiple concurrent video calls, each with its own specific data resulting in different video streams.
- The unique and universal concept of usage of "Video Templates" with a special syntax for built-in logic that allows to define sets of video screens which are based on dynamic data, and precise directives as to the appearance of the resulting video streams in terms of background, structure, presentation location and timing of the different objects and more.
- The possibility of using different "Video Templates" for the same video screen, differentiating for languages, locales or customer groups, using the same set of general screen logics and dynamic parameters.
- The capability to handle a wide range of media types simultaneously—text, images, audio and video—to generate a video stream, as well as full openness for integration with real-time avatar engines (speech-to-avatar converters), the results of which are further processed to enrich the user experience.

These and other advantages can be further understood from the description that follows. In general, the main benefits of various embodiments described herein are obtained by the generation of video screens (or sets thereof) of a high graphical richness and quality in real-time in a telecommunications environment—all based on dynamic data and timing (synchronization) directives, along with diverse types and sources of inputs (text, audio, images, video, etc.). The resulting video screens are comparable in nature to video clips that are currently generated manually by a video editing professional in a studio. The benefits are also obtained by the usage of templates that incorporate dynamic placeholders that are filled-in at runtime with application-specific data, according to built-in flow control instructions. This provides a degree of flexibility in service definition and creation, unparalleled to any existing solution. As can be understood, the templates may be, for example, XML-based or other appropriate formats.

While the invention can be used to deliver various services using video transmission, for a better understanding an example will now be provided of using the invention for enhancing mailbox service to mobile users. According to an embodiment of the invention, the IMVC server 50 is used to enable the video telephony system to perform multimedia to video (MMTV) conversion, to be used as part of the video mail service. The MMTV conversion allows the caller to receive visual information about the mailbox called, in case no greeting or outgoing message (OGM) was left, and allows the subscriber to receive a visual information relating the messages left in his mailbox. The visual information includes all message header information, such as time, date, caller identification (CLI) and other related information. As part of the 3G Mailbox service, MMTV capability will allow a visual representation of the mailbox status, including type of messages (e.g., urgent, normal priority, etc.) presented in a sequential order, thus allowing the user to choose the message he wants to view/hear according to personal priorities. This capability will enhance the service by providing a dynamic graphical screen of the mailbox status without the need to use an embedded client in the handset device. As can be understood, the MMTV capability can be implemented as a stand alone component to be coupled to a video portal or other video interactive voice response (IVR) applications. By externalizing a well defined activation process, other products and applications may utilize the media conversion capability of the MMTV for the purpose of various look and feel generation, as well as prompt and menus generation.

Figure 3:
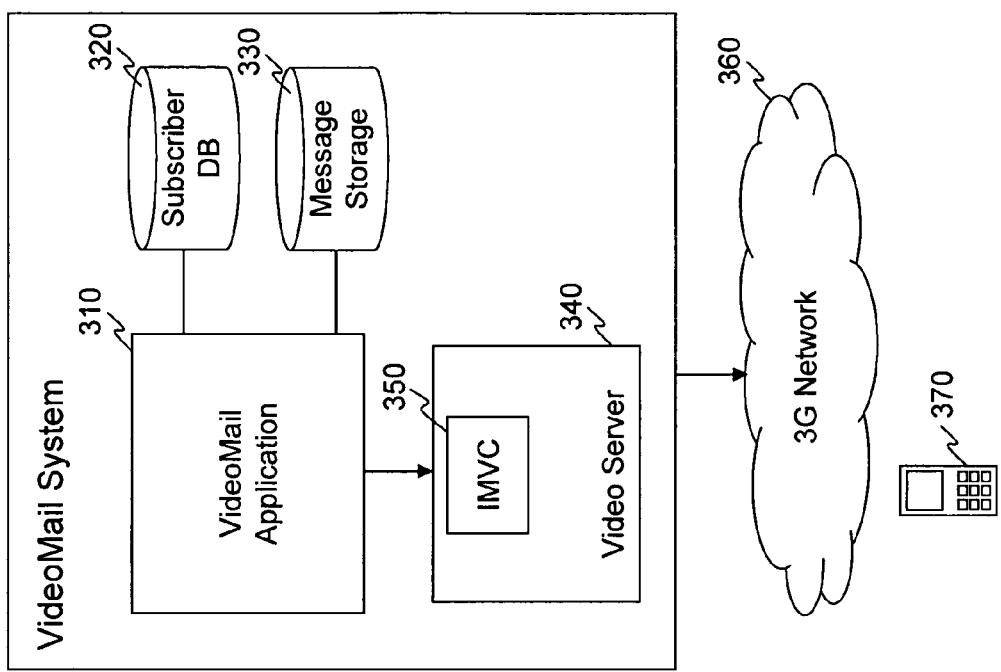
FIG. 3 illustrates another embodiment of the system according to the invention.

Another embodiment of the invention, wherein the infrastructure for generation of dynamic video content is implemented integrally to a video server, is illustrated in FIG. 3. As illustrated in FIG. 3, when a user initiates a video call, the handset 370 establishes a video call with the video server 340, through the telecommunications network 360. In response, video media server 340 initiates a session with the video application server 310, whereupon the video application server 310 loads the user profile from the database 320. The video application server 310 also loads the subscriber quota and/or subscriber stored information and/or system variable video content from the storage 330. The video application server 310 then sends text/graphics or other data, accompanied with a "Template ID," to the video server 340, requesting it to relay that information to the user as part of the video call, according to the specific appearance scheme ("Template") as pointed to in the "Template ID". In order to convert the relevant data to video, video media server 340 incorporates an Infrastructure for Multimedia-to-Video Conversion part (IMVC 350). The IMVC 350 operates in an essentially the same manner as IMVC 50 of FIG. 1. However, since the IMVC 350 is incorporated inside the video server 240, duplication of hardware may be avoided, as the IMVC 350 can be implemented using much of the hardware that is used to implement the video server 340. The IMVC 350 takes the relevant data and using a template corresponding to the Template ID, generates a video stream 160 to be sent back to the handset 370. Video server 340 then transmits the resulting video stream to the video handset 370 via the telecommunications network 360.

Figure 4:
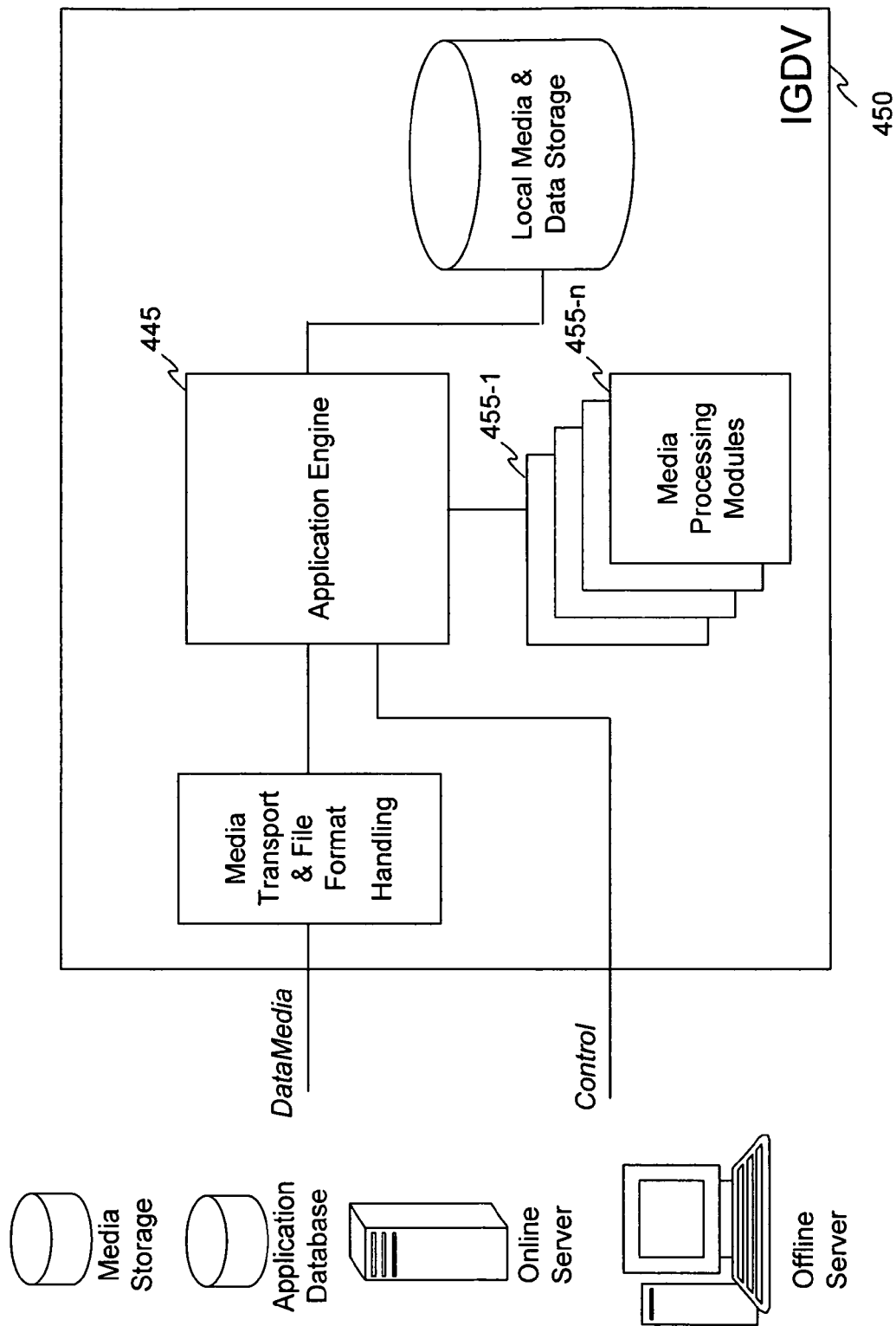
FIG. 4 depicts an example of infrastructure for generation of dynamic video according to an embodiment of the invention.

FIG. 4 depicts an example of an IMVC 450 according to an embodiment of the invention. The IMVC 450 is similar to the IMVC 350 of FIG. 3 and to IMVC 50 of FIG. 1, and may or may not be integrated into the video server. Therefore, it should be understood that any IMVC described herein can be constructed in a similar manner to the IMVC 450 example shown in FIG. 4. As shown in FIG. 4, the IMVC 450 comprises two main elements: an application engine 445 and media processing modules 455-1 to 455-*n*. The number of media processing modules required depends on the complexity and the features sought to be provided by the video service provider.

The application engine 445 handles tasks that are required to provide the IMVC 450 main functionality. Among the functions performed by the application engine 445 are:

Handling of input and output data, from either external or internal sources

Processing logic, e.g. for parsing SMIL or XML-based input and using built-in templates Calling the various data/media processing modules 455-1 to 445-*n* in their appropriate order External interfaces to hosting entities or other components (e.g. a database)

Control logic to allow operation in either real-time or offline mode

User interface for manual operation in either batch mode or through a GUI

Error and exception handling

Operation and business support services

Multi-OS aspects—to maintain compatibility with both Linux and Windows hosting environments.

An SMIL-based syntax can be used to determine the structure of a video screen, i.e., its composition from the various media components. This syntax can be made to be flexible enough to support a wide choice of options for a video screen's appearance, and the dynamics of a video screen in terms of the various clip components' presentation timing. In addition, in order for IMVC to create video content based on dynamic data, scripting language like JavaScript or xsl may be used to define rich templates with built-in logic and flow control, such as logical conditions (e.g. if, switch), loops (e.g. for, while), usage of strings to fill in missing data (e.g. name of user, last login date) and format attributes (e.g. font size, font color). The dynamic data can be restricted by the specific video screen, using tools as XML-Schema, DTD or such.

As shown in FIG. 4, the IMVC 450 incorporates various media processing modules 455-1 to 455-*n*, that will be used for processing input-data conversion between media types, and generation of video output. The main processing modules 455 that may be part of IMVC 450 are the following:

Conversion of image to video, with support for input images of different formats (GIF, JPEG, BMP)

Conversion of text to video, with support for input text of different formats (ASCII, RTF), and with consideration of text formatting options Conversion of text to speech, to automate the process of adding audio dubbing to video screens based on textual meta-data corresponding to content items or other text related to the service Decompression of input video, with support for input video files of various formats, e.g. AVI, WMV, MOV, MP4, 3GP and using various video/audio codecs (MPEG-4, H.263, AMR etc.)

Video editing functions: cutting/appending video, resizing, cropping, applying various filters, etc.

Superimposing an image (picture) or a resized video stream onto existing video according to specific location/size parameters (a.k.a. "PIP"—Picture in Picture)

Extraction of snapshot images from existing video streams (for e.g. insertion of such a PIP image in a video screen)

Real-time generation of Avatar video ("Talking Head") out of input audio Adding static or dynamic watermarks (half-transparent text or image) onto existing video Concatenation of separate video files into the video screen according to specific location/size parameters Adding input audio to the video screen according to specific timing (synchronization) parameters Adaptation of the video screen to the target output format, including modules for frame rate conversion, bit-rate adaptation, transcoding of video and support of output file formats.

As noted before, the more complex features are implemented, the more modules the system may require. Some of the novel features enabled by the modules include:

Video concatenation: appending small video fragments as "windows" into an existing video clip, according to predefined templates and location/size parameters (provided by the templates). Apart from the algorithmic aspects, these operations need to be performed in an efficient manner (for real-time applications). According to one embodiment, efficient processing is made by processing of video in the compressed domain. This eliminates the time and processing bandwidth required to decompress the fragments and recompressed the video once all fragments have been concatenated.

Conversion of text to video: generation of video segments out of text input (with possibly an image or animation as background), through use of formatting and appearance attributes such as: fonts, size, color, orientation, timing of appearance, text animation and more.

Also shown in FIG. 4 is a Local Media and Data Storage unit 460. The local storage unit 460 may be used to store frequently used graphic elements and other data, which are part of the input required to construct video screens. These elements can be stored locally in multiple variants per item to provide different functionality or different look and feel per language, Class of Service (CoS), different service conditions, etc. The following are examples of the elements that may reside in the local storage:

SMIL templates, consisting of the instructions about the looks and dynamics of a video screen Graphic backgrounds ("wallpapers")

Graphic icons which are part of the screen display, e.g. the operator's logo or DTMF buttons Generic or customer-based fonts Audio prompt segments, which are concatenated to create full audio prompts through the process of creating video screens.

The Media Transport and File Format Handling unit 465 is in charge of:

Handling the various file formats in video and audio media, with support for various formats, e.g. AVI, WMV, MOV, RM, MP4, 3GP, WAV, AMR, etc. and, Handling media packetization and de-packetization for real-time transport of media to or from external entities such Media Servers or Streaming Servers.

The IMVC 450 may be developed for use as either a library that can be combined with other products, as a co-hosted process, or as a standalone unit, according to the needs of different services and service providers. The main beneficial feature of the inventive IMVC 450 is the ability to create dynamic graphical screens in a video streaming format in real time. Of course, the IMVC 450 can also be used to create dynamic graphical screens or parts thereof offline. The offline elements can be used individually, or in combination with the real-time created elements. For example, during real-time generation of the dynamic graphical screens, the IMVC 450 can use various elements that were created off line and place them in accordance with the placement instructions embedded in the templates.

When the IMVC 450 is operated in a real-time mode, it functions to serve requests to generate video screens according to a set of predefined templates. The IMVC 450 should beneficially be implemented as a light, highly efficient yet functionally rich unit that can support multiple requests in real-time or near real-time, either as a standalone server, as a process integrated within the video server, or as a library that is integrated into another service module. Functional and algorithmic efficiency is an important parameter for the design and implementation of the infrastructure that can serve real-time generation of video screens.

Examples of services in which the IMVC 450 generates real-time video screens may include videomail, SMS messages, infotainment, etc. For example, the IMVC 450 may be used to generate real time video prompts. In this case, the videomail application server will utilize the IMVC 450 capabilities to execute requests, accompanied by relevant input data, to generate video prompts that correspond with the various stages or states of a videomail call, for example:

A visual and/or animated 'status' screen that displays the current condition of the mailbox, e.g. "You have 5 new video message(s), 1 new voice message(s), and 2 new email message(s)" in a dynamic graphical manner.

A visual prompt presenting the user with available options at that moment, e.g. "To reply press '1', to delete press '2', to forward press '3', for next message press '9'".

An 'envelope' preview screen of a message that is about to be played, with information about he sender, when the message was sent, etc. The preview screen could potentially include a picture of the sender ("Picture ID"), an image taken from a frame snapshot in the video clip of the message, or a preview window within that screen with a short video snapshot that presents a "summary" of the message.

These and other video screens could also include a background image with branding information from the provider of this service (logo or other), or other dynamic promotional content from the service provider, which can be context- and/or subscriber-dependant.

Figure 5:
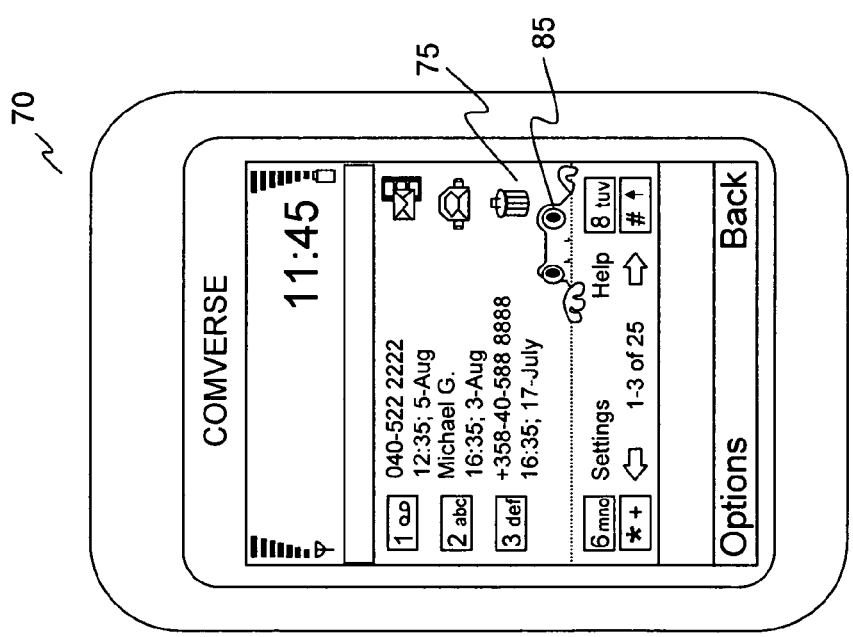
FIG. 5 depicts an example of a video screen generated by the infrastructure for generation of dynamic video and displayed on the mobile video handset.

FIG. 5 depicts an example of a video screen generated by the IMVC 450 and displayed on the mobile video handset 70. The general order and location on the screen of various elements can be dictated by the template, while the appearance of the elements may be made according to user preference stored in the user's profile. This can be done by having a library of stored elements in image format, such as Gif files, and allowing the user to pre-select items from the library. For example, element 75 appears as a trashcan, but other images, such as a recycling bin can be used and provided as a selectable preference by the user. Similarly, element 85 can provide personalization of the handheld device 70 or, alternatively be used as a service provider branding mechanism. For example, if element 85 is used for personalization, then various images can be made available for the user's pre-selection for customization. In such a case, element 85 can also be used as an avatar of the user. On the other hand, when element 85 is used as a branding mechanism by the service provider, the image cannot be changed by the user. Rather, an image associated with the branding of the service provider can be used, such as, for example, the humanized X used by Cingular. As can also be appreciated, since the IMVC 450 sends the screen display as a video transmission, any element, and particularly element 85, may incorporate motion and audio. For example, as is shown in FIG. 5, there are 2 new and 23 saved messages in the mailbox. Accordingly, the transmission of the video screen may include motion of the frog 85, with audio announcing: "there are two new and twenty-three saved messages," in a cartoon-like animation and audio. As can be understood, using the inventive system the animation of frog 85 can be done on-the-fly and without the need for a client software on the handset device. This is advantageous since using the embodiments of the invention the animation can be provided to any handset device capable of receiving video streaming, regardless of whether it has any client software installed therein.

In order to generate the video stream that forms the display on the handheld device 70, as shown in FIG. 5, the IMVC 450 receives the data relating to the mailbox, such as number of message, information relating to each message, etc. The IMVC 450 also receives the template ID that is generated to be specific to the state of the call. The IMVC 450 then uses a template that corresponds to the template ID, which includes elements arrangements and location, etc. The IMVC 450 further receives the user's preference data, which may indicate which images, colors, etc., to be used with the template. The IMVC 450 then makes the appropriate conversions, e.g., text to image, and translates all of the resulting data to the appropriate format for video transmission. The IMVC 450 then assembles the resulting video parts into a video stream for transmission. The assembly is made so that each element appears according to the template and the user selected preferences. Of course, the template may include service-provider set parameters that cannot be modified or changed by the user. For example, the service provider may force the template to always include the service provider's logo at a certain location on the screen.

The templates are stored in the media server, e.g., video server 40 of FIG. 1, and every template has a template ID associated therewith. Different template ID's are selected according to the state of the call to direct the selection of the appropriate template for video generation. The template provides the server with the way in which the video screen should be rendered. According to one embodiment, after the first video stream is generated, the same template is kept for the remaining of the call duration. This ensures that the same "look and feel" is maintained throughout the call.

Figure 6:
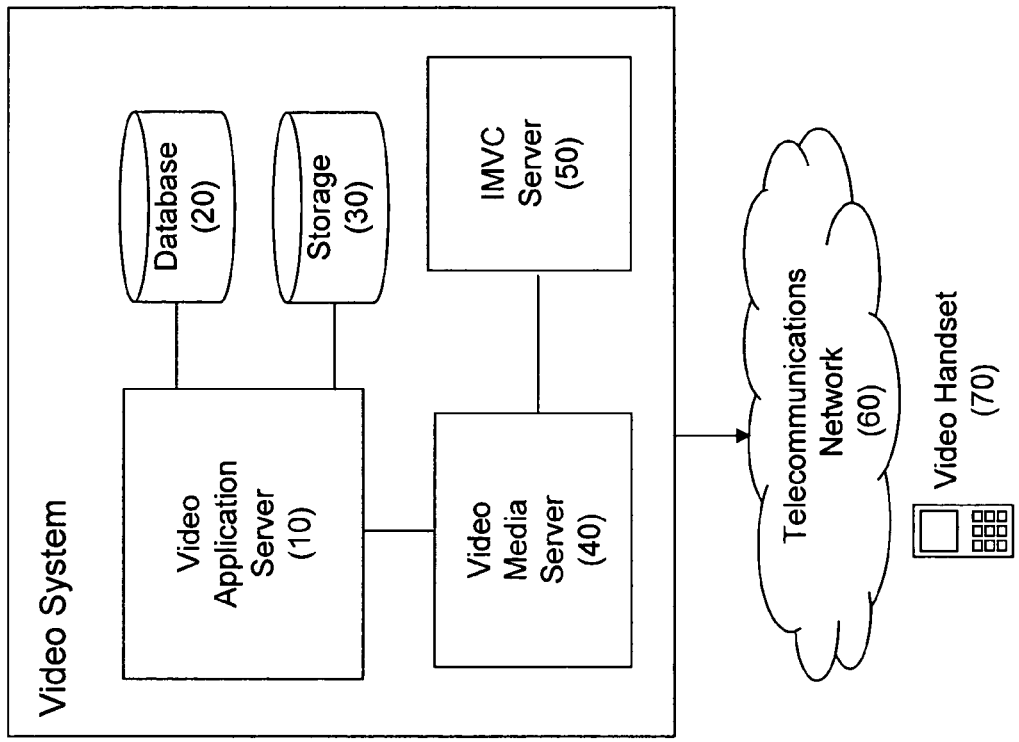
FIG. 6 depicts an embodiment of a video IVR system according to the invention.

Much of the above description was provided in terms of an embodiment using the inventive features for a mailbox implementation. Of course, the inventive features can be used in other embodiments. For example, video interactive voice response system can be built using the invention and utilized to provide a variety of services and applications. An embodiment of a video IVR system is shown in FIG. 6. The system is similar to that shown in FIG. 1, however, the storage element may be omitted. Some applications that may be implemented using the video IVR system of FIG. 6 include:

- A video voting application: this application allows users to vote for or rate different 'items.' The items may be items transmitted over the network, such as video clips (e.g., the best goal in a football game, the best music video, etc.) or item not related to the network, e.g., an application that lets user participate in a political poll during elections. The role of the IMVC infrastructure would be, for instance, to generate the dynamic video prompts corresponding to the changing states (e.g., the current options open for a vote), to show interim results, and so on. In case that actual video clips (content) are shown as part of the voting process then a "storage" element is needed. Otherwise, it's redundant as all static and dynamic data is saved in the database or even locally in the Video Application Server.
- A video-based ticket reservation system or registration system. In this application, dynamic video prompts would be generated using the IMVC server, based on the dynamic data that resides in the Database. The user may then make appropriate selection to generate responses using the keys or touch screen when available. Also, in this case there would typically be no need for the storage element; however, a storage element can be used to store user accounts to enable faster transaction by storing user data, such as preferred mailing address, credit card numbers, etc.
- A video gaming system: a system that allows the user to play games against the application (server) or against other players. For this application, dynamic screens would be generated by the IMVC server based on data that is sent by the game application according to each state in the game, or fixed data from the database. When the user is limited to participation only on a single session basis, no storage is needed. However, if the user is able to join session on an ad hoc basis and carry all results to all sessions, then storage may be used to maintain user's status in the game (e.g., number and type of weapons available, number of points in the game, etc.)

As can be understood, numerous other applications that belong to the generic "Video IVR" category can be developed, such as, for example, a Video Dating system, a Video Ringtones application (to select video ringtone), Video Blogging, and so on.

Figure 7:
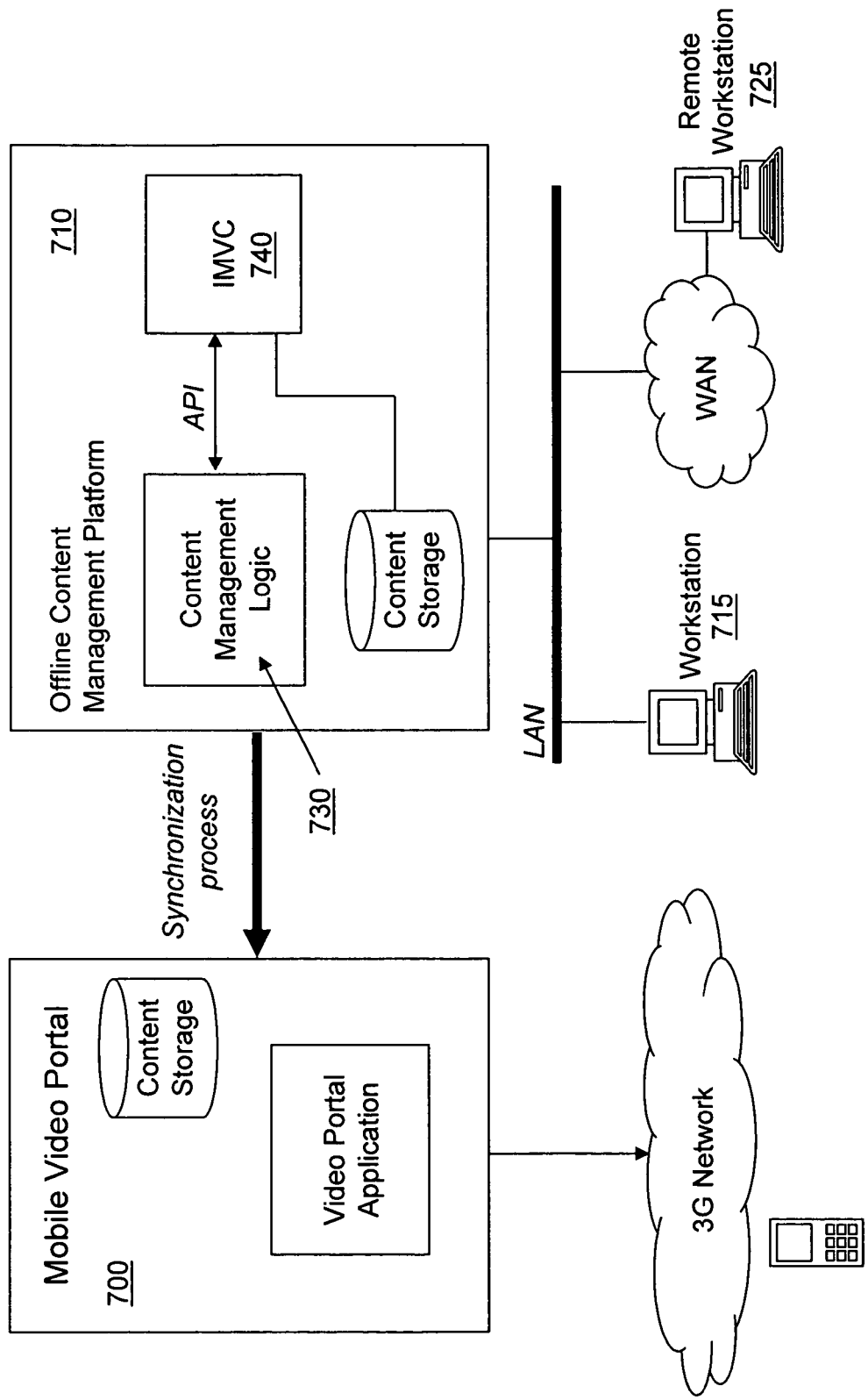
FIG. 7 depicts an embodiment of a video portal (or "video on demand") system for video telephony according to the invention.

Yet another embodiment of the invention is a video portal (or "video on demand") system for video telephony. While as in the other embodiments this system is also a real-time system, the dynamic video clips are generated by the IMVC infrastructure in an offline or semi-real-time process. An example of such embodiment is illustrated in FIG. 7. In FIG. 7, mobile video portal 700 is abbreviated graphically, but in general it should look exactly like the generic video system in illustrated in FIG. 1, less the IMVC part. In this case, after new content is provisioned by the video portal service's administrator (through either a local workstation 715 or remote workstation 725), the content management application 730 issues a request from the co-hosted IMVC process 740 to generate new video screens that correspond with new content items or the modified service flow—through usage of relevant meta-data (e.g. text with clip names, cost, etc.) and media (e.g. images or short snapshots form the new content items). After the new video screens are created, synchronization of the new content tree structure and content items may start, together with corresponding video screens, into the operative video portal system 700.

The embodiment shown in FIG. 7 is particularly efficient in terms of processing resources. That is in this embodiment the "dynamic" video screens are created in an offline process and not real time. Since video portals often update the content tree only once or several times per day, and between these updates the content tree stays the same, the same kind of information needs to be presented to all users during these relatively long intervals (typical information is content categories and sub-categories to select from, description of the content items (movies) and costs, etc.). By generating the clips offline and periodically updating the video clips, one can spare the processing power that would be required if these clips were to be generated by the IMVC server for each session.

The embodiment of FIG. 7 can be used offline to generate various template video screens for the user's selection and usage. For example, the system can be used offline to generate a variety of greeting templates from which the user can select a desired greeting which will be transmitted as a video stream. Similarly, the system can be used to generate "fixed" video screens, such as various help screens and menus, which can be transmitted to the mobile device as a video stream. Also, when the system is used as a video library, various video screens that provides clip information, such as length, cost, artist name, etc., can be generated offline to save processing power.

Thus, while only certain embodiments of the invention have been specifically described herein, it will be apparent that numerous modifications may be made thereto without departing from the spirit and scope of the invention. Further, certain terms have been used interchangeably merely to enhance the readability of the specification and claims. It should be noted that this is not intended to lessen the generality of the terms used and they should not be construed to restrict the scope of the claims to the embodiments described therein.

The invention claimed is:

1. A communication system that converts multimedia data into a video stream for transmission to a user's handset communication device, comprising:

a storage system that stores multimedia data and an identifier for a handset communication device;

an application server that manages storage and retrieval of said multimedia data and said identifier from said storage system;

a multimedia to video converter that:
(a) receives said multimedia data and said identifier;
(b) selects a template from a plurality of templates, based on said identifier, thus yielding a selected template, wherein said plurality of templates specify layouts of data for a plurality of handset communication devices, and wherein said selected template specifies a layout of data in a video stream for said handset communication device; and
(c) converts said multimedia data into said video stream in accordance with said selected template; and an access server that:
(a) interfaces with said application server to obtain said multimedia data and said identifier from said storage system;
(b) provides said multimedia data and said identifier to said multimedia to video converter and receives therefrom said video stream; and
(c) transmits said video stream onto a telecommunication network.

2. The system of claim 1, wherein said multimedia data comprises the system data or user data.

3. The system of claim 2, wherein said system data or user data comprises textual data, images, audio clips, and video clips.

4. The system of claim 3, wherein said images comprise graphics and photography images.

5. The system of claim 4, wherein said video clips comprise animation clips and cinematic clips.

6. The system of claim 1,
wherein said multimedia to video converter comprises a plurality of media processing modules, and
wherein each one of said media processing modules converts one of said textual data, images, and audio clips into a video-transmission format files.

7. The system of claim 6, further comprising a processor for concatenating said video-transmission format files into a single video stream.

8. The system of claim 7, wherein said video stream comprises dynamic graphical display to be displayed on said handset communication device.

9. The system of claim 8, wherein a layout of said dynamic graphical display is dictated by said selected template.

10. The system of claim 8, wherein said dynamic graphical display comprises graphical items, graphic animation, text and video.

11. The system of claim 10, wherein said graphical items comprise active icons.

12. The system of claim 1,
wherein said multimedia to video converter comprises a plurality of media processing modules, and
wherein each one of said media processing modules converts one type of data of said multimedia data having a first format into a second format.

13. The system of claim 12, wherein said first format comprises one of text, images, video and audio, and said second format comprises video.

14. The system of claim 13, further comprising a processor that assembles the output of said media processing modules into said video stream for transmission to said handset communication device.

15. The system of claim 14, wherein said video stream comprises a visual interface to be displayed on said handset communication device.

16. The system of claim 15, wherein a layout of said visual interface is dictated by said selected template.

17. The system of claim 15, wherein said visual interface comprises graphical items.

18. The system of claim 17, wherein said visual interface further comprises graphic animation.

19. The system of claim 1,
wherein said storage system comprise a template storage location that stores said plurality of templates, and
wherein each of said plurality of templates comprises instructions regarding looks and dynamics of a video screen.

20. The system of claim 19, wherein said storage system further comprise a background storage location that stores a plurality of graphic backgrounds.

21. The system of claim 20, wherein said storage system further comprise an icon storage location that stores a plurality of icons.

22. The system of claim 21,
wherein each of said plurality of templates comprise selection pointers to at least one of said graphic backgrounds and icons, and
wherein said multimedia to video converter fetches at least one of said graphic backgrounds and icons according to said pointer and incorporates the fetched graphic background or fetched icon into said video stream.

23. The system of claim 1, wherein said multimedia to video converter comprises an image to video converter for converting pictorial and graphical images into said video stream.

24. The system of claim 23, wherein said multimedia to video converter further comprises a text to video converter.

25. The system of claim 24, wherein said multimedia to video converter further comprises a video editor for editing said video stream by resizing, cropping or applying filters to said video stream.

26. The system of claim 1, further comprising a database that stores therein a user profile data.

27. The system of claim 26, further comprising a mailbox for storing messages.

28. The system of claim 27,
wherein said storage system also stores status data of said messages, and
wherein said multimedia to video converter converts said status data into a video stream for transmission to said handset communication device.

29. The system of claim 26, further comprising a library database that stores a plurality of video clips and video data comprising information relating to each of said video clips.

30. The system of claim 29, wherein said multimedia to video converter converts said video data into a video stream for transmission to said handset communication device.

31. A method for operating a communication server connected to communication network that communicates with handsets, comprising:
assigning a plurality of user accounts, wherein each of said user accounts corresponds to one of said handsets to thereby create corresponding accounts to at least a subset of said handsets;
storing user data corresponding to each of said user accounts in a database; and
upon receiving a call initiation from a caller handset, determining whether one of said user accounts correspond to said caller handset and, if so:

fetching said user data corresponding to the user account of said caller handset;

selecting a template from a plurality of templates, based on said user data, thus yielding a selected template, wherein said plurality of templates specify layouts of data for a plurality of handset communication devices, and wherein said selected template specifies a layout of data in a video stream for said caller handset;

converting said user data into said video stream in accordance with said selected template; and transmitting said video stream to said caller handset.

32. The method of claim 31, further comprising:

creating a mailbox for each of said user accounts;

storing status data for each of said mailbox; and, wherein upon receiving a call initiation from said caller handset to a corresponding mailbox, said method further includes:

fetching said status data of the corresponding mailbox;

converting said status data into a video stream; and transmitting said video stream to said caller handset.

33. The method of claim 32, wherein said status data comprises textual items, and wherein said converting said status data further includes converting said textual items into audio clips and dubbing said audio clips onto said video stream.

34. The method of claim 32, wherein said selected template corresponds to said mailbox, and wherein said converting comprises:

fetching graphical items corresponding to said selected template; and using instructions from said selected template to incorporate said graphical items into said video stream.

35. The method of claim 34, wherein said video stream is made to generate a dynamic graphical display on said caller handset.

36. A system that converts multimedia data into a video stream for transmission to a user's handset communication device, comprising:

an application engine that:

(a) manages data storage and retrieval from a storage system that stores a plurality of templates that specify layouts of data for a plurality of handset communication devices;

(b) selects a template from said plurality of templates, based on information that identifies a handset communication device, thus yielding a selected template; and (c) obtains said selected template from said storage system; and a multimedia processor that:

(a) receives multimedia data and said selected template; and (b) converts said multimedia data into a video stream in accordance with said selected template.

37. The system of claim 36, further comprising said storage system, wherein said storage system also stores said multimedia data.

38. The system of claim 36, wherein said multimedia processor comprises a plurality of media processing modules, and wherein each one of said media processing modules converts one of textual data, images, and audio clips into a video-transmission format files.

* * * * *